(12) United States Patent
Lambert et al.

(10) Patent No.: US 8,799,539 B2
(45) Date of Patent: Aug. 5, 2014

(54) CHIPSET AGNOSTIC APPARATUS AND METHOD FOR SERIAL COMMUNICATION BUS PORT DISABLEMENT

(75) Inventors: Timothy Michael Lambert, Austin, TX (US); Sean Hart, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 785 days.

(21) Appl. No.: 11/550,792

(22) Filed: Oct. 18, 2006

(65) Prior Publication Data

US 2008/0147924 A1 Jun. 19, 2008

(51) Int. Cl.
*G06F 13/12* (2006.01)

(52) U.S. Cl.
USPC .......................................................... 710/62

(58) Field of Classification Search
USPC .......................................................... 710/62
See application file for complete search history.

(56) References Cited

U.S. PATENT DOCUMENTS

| | | | |
|---|---|---|---|
| 6,092,123 A * | 7/2000 | Steffan et al. ...................... 710/8 |
| 6,131,134 A * | 10/2000 | Huang et al. ................... 710/302 |
| 6,279,060 B1 * | 8/2001 | Luke et al. ....................... 710/64 |
| 6,436,764 B1 | 8/2002 | Hsieh | |
| 6,600,739 B1 | 7/2003 | Evans et al. | |
| 6,877,058 B2 | 4/2005 | Sato et al. | |
| 6,912,663 B1 | 6/2005 | Dayan et al. | |
| 6,970,964 B2 * | 11/2005 | Mowery et al. ............... 710/302 |
| 7,043,575 B2 | 5/2006 | Stephan | |
| 7,043,587 B2 | 5/2006 | Burke et al. | |
| 7,150,397 B2 * | 12/2006 | Morrow et al. ............... 235/451 |
| 2003/0084133 A1 * | 5/2003 | Chan et al. .................... 709/222 |
| 2003/0158990 A1 | 8/2003 | Allen et al. | |
| 2004/0030742 A1 | 2/2004 | Kitagawa | |
| 2005/0057295 A1 | 3/2005 | Tsai et al. | |
| 2007/0124474 A1 * | 5/2007 | Margulis ....................... 709/226 |

* cited by examiner

*Primary Examiner* — Henry Tsai
*Assistant Examiner* — Juanito Borromeo
(74) *Attorney, Agent, or Firm* — Baker Botts L.L.P.

(57) ABSTRACT

An information handling system (IHS) includes a host computer with a downstream facing host computer serial communication bus port and a serial communication bus host controller, wherein the controller is configured to detect a serial communication bus device connected to the downstream facing host computer serial communication bus port, wherein the serial communication bus device has a pull-up resistor. The IHS further includes a circuit disposed between the serial communication bus host controller and the downstream facing host computer serial communication bus port, the circuit configured to disable the downstream facing host computer serial communication bus port and comprising at least one tri-state buffer.

20 Claims, 3 Drawing Sheets

CHIPSET AGNOSTIC APPARATUS AND METHOD FOR SERIAL COMMUNICATION BUS PORT DISABLEMENT

BACKGROUND

1. Technical Field

The present disclosure generally relates to information handling systems, and, more particularly, to serial communication bus ports.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

There are many applications where it is desirable that individual USB ports be disabled, such as computers, servers or blades that have various internal and external ports. Past, current and known future planned chipsets for servers offer the ability only to disable all ports, none of the ports or only ports in pairs and in only a descending order. In order to get around this limitation, many server platform designers implement a USB hub that is internal to the platform so that the users can drive the hub or disable USB ports using a general purpose input/output (GPIO) facility to turn off the USB hub. Unfortunately, the separate USB hub solution for disabling USB connections consumes about one square inch of board real estate per instantiation on tight layouts such as control panels and blade servers. In addition to taking up valuable board real estate, a USB hub also consumes power. Furthermore, some applications do not handle booting from ports that are behind a certain number of USB hubs (e.g., 5 for some common BIOS versions).

SUMMARY

The following presents a general summary of some of the many possible embodiments of this disclosure in order to provide a basic understanding of this disclosure. This summary is not an extensive overview of all embodiments of this disclosure. This summary is not intended to identify key or critical elements of the disclosure or to delineate or otherwise limit the scope of the claims. The following summary merely presents some concepts of the disclosure in a general form as a prelude to the more detailed description that follows.

According to one embodiment there is provided an information handling system (IHS) including a host computer. The system also includes a serial communication bus+ data line and a serial communication bus data line. The system further includes a first tri-state buffer connected to the serial communication bus+ data line, and a second tri-state buffer connected to the serial communication bus− data line. The system even further includes a signal control input channel enabling communication between the host computer and the first and second tri-state buffers.

According to another embodiment there is provided an information handling system including a host computer having a downstream facing host computer serial communication bus port and a serial communication bus host controller. The controller is configured to detect a downstream facing serial communication bus device connected to the downstream facing host computer serial communication bus port, wherein the serial communication bus device has a pull-up resistor. The system also includes a circuit disposed between the serial communication bus host controller and the downstream facing host computer serial communication bus port, the circuit configured to disable the downstream facing host computer serial communication bus port and comprising at least one tri-state buffer.

According to even another embodiment there is provided a method of disabling a downstream facing serial communication bus port. The method includes enabling a first tri-state buffer to sink current on serial communication bus+ line wherein the serial communication bus+ line is positioned between a serial communication bus host controller and a downstream facing serial communication bus port. The method also includes enabling a second tri-state buffer to sink current on serial communication bus− line wherein the serial communication bus− line is positioned between a serial communication bus host controller and a downstream facing serial communication bus port.

BRIEF DESCRIPTION OF THE DRAWINGS

The following drawings illustrate some of the many possible embodiments of this disclosure in order to provide a basic understanding of this disclosure. These drawings do not provide an extensive overview of all embodiments of this disclosure. These drawings are not intended to identify key or critical elements of the disclosure or to delineate or otherwise limit the scope of the claims. The following drawings merely present some concepts of the disclosure in a general form. Thus, for a detailed understanding of this disclosure, reference should be made to the following detailed description, taken in conjunction with the accompanying drawings, in which like elements have been given like numerals.

DETAILED DESCRIPTION

A non-limiting illustrative embodiment of an information handling system (IHS) is presented through one or of more its various aspects such as those noted below. In a particular embodiment a chip set agnostic host side discrete method for USB port enablement/disablement for information handling systems is described. While many embodiments are illustrated in terms of a USB port and accompanying devices, it should be understood that the present disclosure has applicability in general to serial communication bus ports and accompanying devices.

For purposes of this disclosure, an IHS may include any instrumentality or aggregate of instrumentalities operable to compute, classify, process, transmit, receive, retrieve, originate, switch, store, display, manifest, detect, record, reproduce: handle, or utilize any form of information, intelligence, or data for business, scientific, control, or other purposes. For example, an IHS may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit communications between the various hardware components.

Figure 1A:
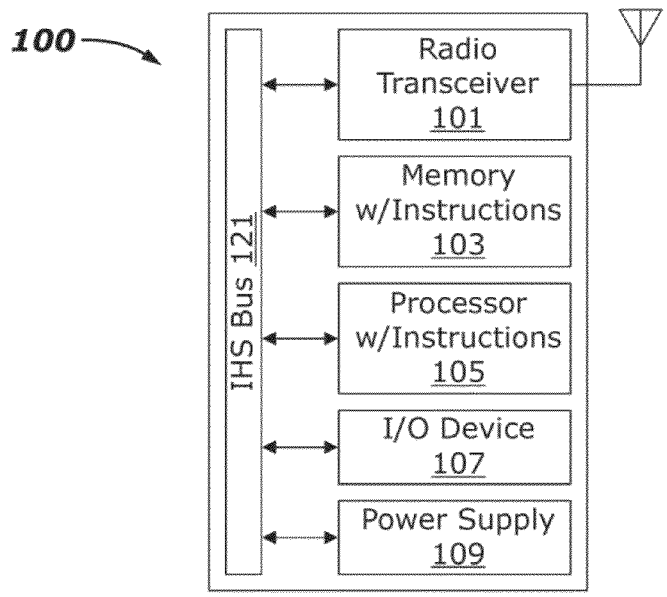
FIGS. 1A and 1B are non-limiting diagrammatic representations of an information handling system 100 and 120 respectively.

An example of an IHS, such as a server blade or host computer, is illustrated with FIG. 1A, an embodiment of an IHS within which a set of instructions may enable the system to perform any of the embodiments disclosed herein. An IHS may be a standalone system, computer, host computer, server or blade, or may be connected to other systems within a network. IHS 100 may include a radio transceiver 101 connected to an antenna for providing wireless access to systems, networks and devices. In a networked deployment, the IHS may operate as a server or a client in server-client networked environment or as a member of a distributed network environment. Memory 103 may be volatile or non-volatile memory with instructions and data. A central processing unit (CPU) 105 or other processor may be included with instructions. The instructions may at least partially reside within the memory 103 and/or within the processor 105 during execution. Memory 103 and processor 105 may include machine-readable media.

Machine-readable media includes solid-state memory such as cards or other non-volatile memories, random access memories or other volatile memories, magneto-optical or optical media (e.g.; disk or tape), or signals embodying computer instructions in a transmission medium. A machine-readable medium for the embodiments disclosed herein includes equivalents and successor media.

Figure 2:
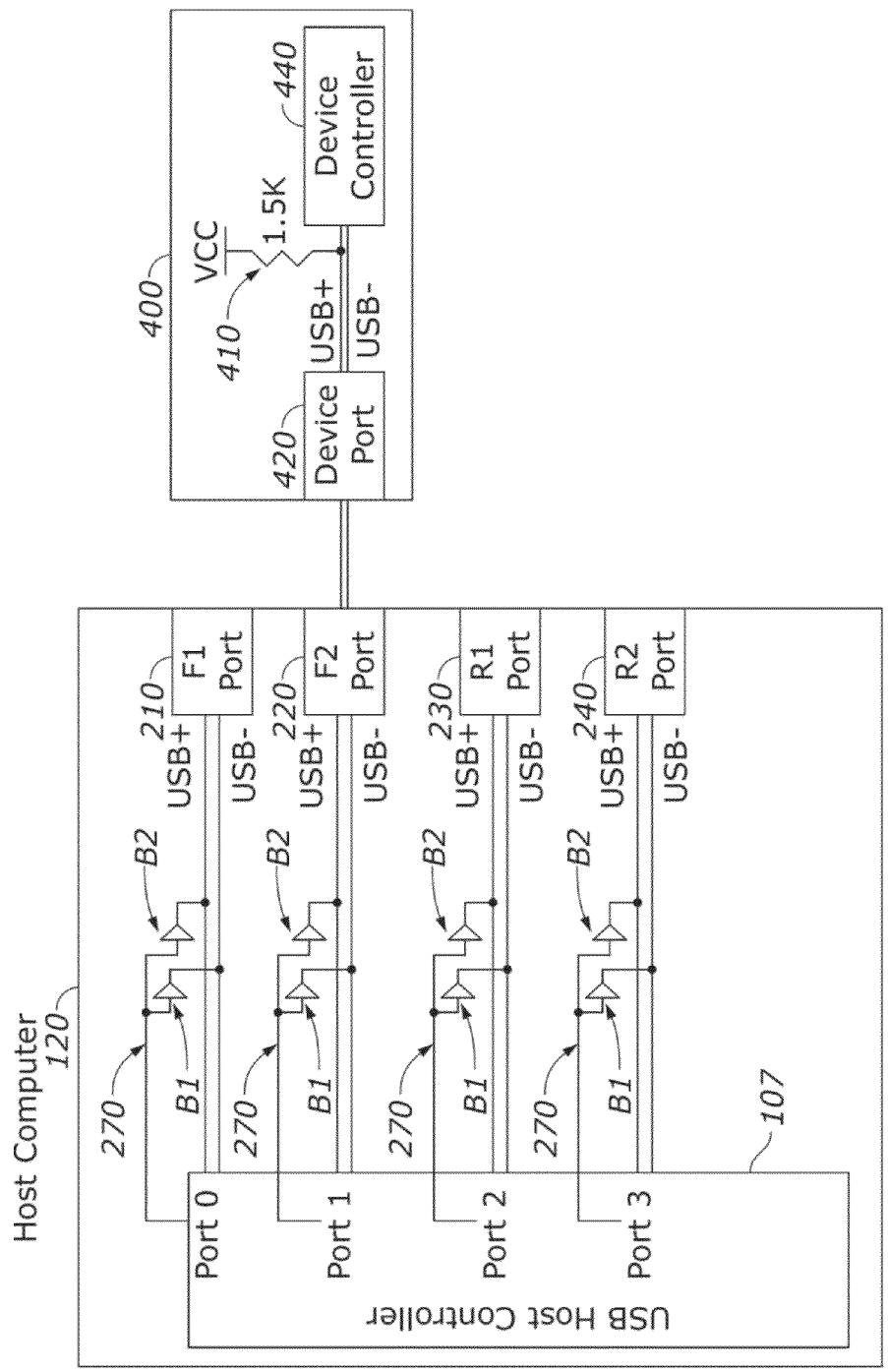
FIG. 2 is a non-limiting diagrammatic representation of an embodiment of a method or apparatus for disabling or enabling serial communication bus ports individually.

An input/output device 107 is provided to send data to, or receives data from, other system components or devices. A non-limiting example of an input/output device is a USB Host Controller 107 as illustrated in FIG. 2. A power supply 109 provides energy to the system. At least one IHS bus 121 provides communication between and among components.

Figure 1B:
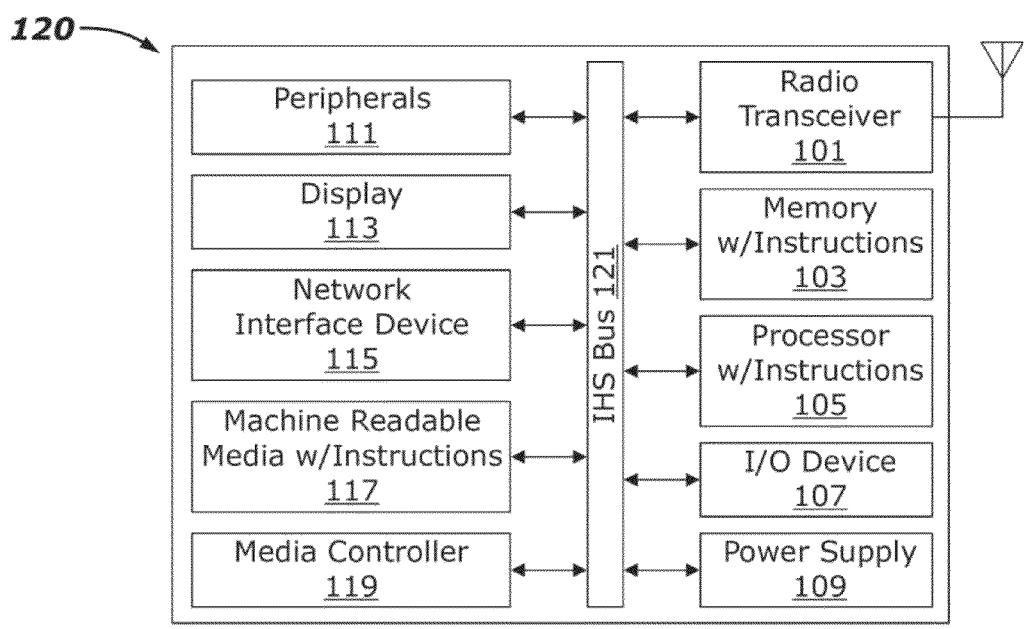

Additionally, referring now to FIG. 1B, IHS 120 may include additional peripherals 111 (keyboards, GPS receivers, USB adapter, headphones, microphone, wireless audio transmitter, print adapter, mouse, serial adapter, etc). Various types of display device 113 may be attached or linked with IHS 120. Network interface equipment such as Network Interface Controller 115 (NIC) may provide hardwired access to infrastructure. Other interfaces may include a PCI bus, and USB ports, etc. A machine readable medium with instructions 117 may be on a disk drive device and provide additional software and data storage capability to IHS 120.

Processor 105 may carry out graphics/memory controller hub functions and enable input/output (I/O) functions for I/O device 107 and associated peripherals 111. Peripherals 111 such as a mouse, keyboard, and tablet are also coupled to other components at the option of the user. The IHS bus 121 may connect to I/O devices 107. Non-limiting examples of an IHS bus may include a Peripheral Component Interconnect (PCI) bus, PCI Express bus, SATA bus or other bus is coupled to enable IHS bus 121 to be connected to other devices which provide IHS 100 or 120 with additional functionality. A universal serial bus (USB) or other I/O bus may be coupled to IHS bus 121 to facilitate the connection of peripheral devices 111 to IHS 120. System basic input-output system (BIOS) may be coupled to processor 105. BIOS software is stored in nonvolatile memory 103 such as CMOS or FLASH memory. A network interface controller (NIC) 115 is coupled to processor 105 to facilitate connection of system 100 or 120 to other information handling systems. A media drive controller 119 is coupled to processor 105 through bus 121. An example of a media drive controller may include a baseboard management controller (BMC). Devices that can be coupled to media drive controller 119 include CD-ROM drives, DVD drives, hard disk drives and other fixed or removable media drives. It should be understood that the technology disclosed herein is not only applicable to the embodiment of FIG. 1 but is also applicable to the other types of IHSs.

In one non-limiting embodiment, there is provided a low cost, small footprint device and simplified method for disabling USB ports on an individual basis, regardless of the chipset port disablement features that are onboard.

The USB 1.1 and 2.0 specifications state that a USB device pulls the USB+ or USB− signal (alternatively termed D+ or D− signal) to VCC in order to signal the USB host controller that a device is present and also signals the speed at which the device is capable of providing data. The three data speeds are termed low-speed, full-speed and hi-speed. The resistor pull-up causes the host BIOS or OS to query the connected device type, load the appropriate driver and further enumerate the connecting device.

In a non-limiting embodiment illustrated in FIG. 2 and consistent with USB 1.1 and 2.0 specifications, a USB device 400 connecting through its device port 420 will indicate its data communication speed capability by pulling either the USB+ or USB− line high to VCC. A full-speed device will use a pull up resistor 410 attached to USB+ to specify itself as a full speed device. On low and full speed devices, a differential '1' is transmitted by pulling USB+ over 2.8V with a 1.5K ohm resistor pulled to ground and USB− under 0.3V with a 1.5K ohm resistor pulled to VCC. A differential '0' on the other hand is a USB− greater than 2.8V and a USB+ less than 0.3V with the same appropriate pull down/up resistors. A pull up resistor 410 at the device end wilt also be used by the host or hub to detect the presence of a device 400 connected to its port. Without a pull up resistor 410, or if no resistor is seen by a host controller to be pulled up, a USB host controller 107 assumes there is nothing connected.

USB 1.1 and 2.0 specifications, current at the time of application, require a nominal 1.5K-ohm resistor between USB+ or USB− and VCC for this function. Adding an open drain buffer to the USB+ and USB− signals near the USB host controller port prevents the device side putt-up resistor from effectively raising the signal above the threshold to cause a device insertion-event or present-event to be detected by the USB host controller and thus the connecting device does not get enumerated.

FIG. 2 illustrates a USB host controller 107 with downstream facing ports 210, 220, 230 and 240 residing within a host computer 102. As used herein an "upstream" facing port faces toward the host computer 102 and a "downstream" facing port faces away from the host computer 102 and toward a peripheral device and may receive a connection from the peripheral device. When a downstream facing port (e.g. 220) is to be enabled, the open drain buffers (B1 and B2) tri-state to allow the USB device to pull-up the appropriate signal depending on its supported speed. Placing this buffer near the host controller reduces stub effects on the differential pair. Tri-state or open drain buffers may include CMOS transistors, which may be PMOS and NMOS.

When a port is to be disabled, the tri-state buffer holds the USB+ and USB− signals low, even when a device is present and/or connected and so sinks the current from the pull-up (e.g., 5V/1.5Kohm =~3mA of sink current). So when a pull-up resistor is present, the host controller and/or host computer 102 will not 'see' or detect it and therefore enumeration of any connected device by the host will not occur. In this manner the host computer 102 or server has the ability to disable ports via essentially grounding out both of the USB signal lines, not just the USB+ so that for any pull-up resistors it looks like no device is connected even if a device is plugged in, so that any selected port is effectively disabled from any usage.

By routing both signals (USB+ and USB−) through a dual tri-state buffer and then driving a signal (e.g. with control signal over path 270) to sink current on these lines inside the host, any device plugged in will not be visible to the host computer. This implementation may include using dual buffers so that the differential pair can be routed through the pin pads without disturbing the signal spacings for normal operation.

In addition to finding utility on the host side, the method and apparatus disclosed herein may also find utility with implementations for USB ports that have enable or disable features downstream of the host port (e.g. 210 or 220) on the device side as opposed to the server or host side.

Various embodiments of the present disclosure may consume less board space or nearly negligible power (about 18 mW in some embodiments) as compared to implementing a USB hub. This may reduce the probability for customer issues that may arise to due to the use of multiple back-to-back hubs and/or do not perturb the signal integrity when enabled, as would happen with isolation logic such as the use of a USB MUX or FET switch.

Figure 3:
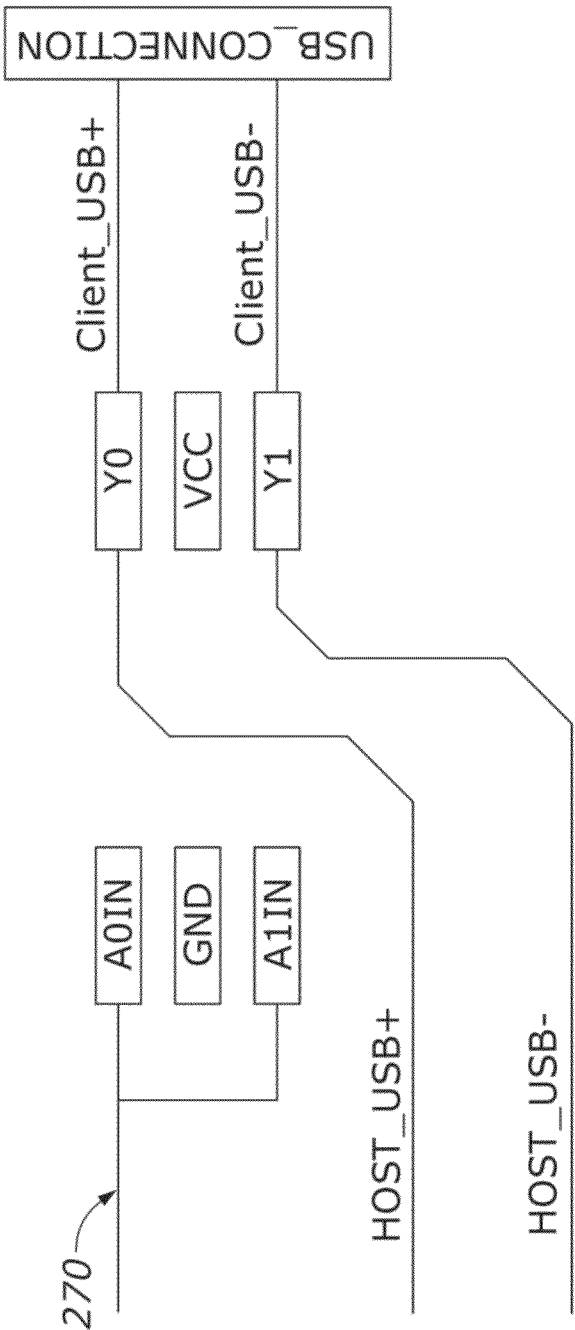
FIG. 3 is a non-limiting schematic of a printed circuit board of an embodiment for implementing individual serial communication bus port enablement/disablement.

FIG. 3 is one of several possible examples illustrating an implementation of a package on a printed circuit board (PCB). Using the routing scheme illustrated in FIG. 3 minimizes impedance disruptions. Impedance tolerances outlined in the USB 2.0 Specification may have an effect on the data communication transfer speed. The dual tri-state buffers B1 or B2 may be placed between the USB Host Controller and a downstream facing USB connector or port. It may be advantageous to place the buffer connection physically near the USB Host Controller to minimize impedance concerns. To be USB 2.0 compliant downstream facing USB connectors or ports must support low-speed, full-speed and high-speed signaling and must be able to transmit data at each of the associated rates.

A control signal input line or channel 270 between provides for whether signal input to A0IN and/or A1IN tri-states the buffers and/or provides a drain to ground GND. Any signal that traverses USB+ or USB− lines may be accessed at pad Y0 or Y1 respectively. The embodiment illustrated in FIG. 3 is a way to implement the apparatus and method without risking stubs that may negatively impact system impedances. Other solutions that interrupt signal continuity that may be implemented include lines or structures within the host side USB bus or downstream facing port configuration may cause negative signal integrity repercussions (e.g. reflections, etc.). Adding a stub on a USB signal line between a host controller and downstream facing host port may compromise signal integrity resulting in performance problems and/or functional problems.

The "disable" signal lines (e.g.; 270) associated with control buffers B1 or B2, do not need to originate from the host (USB host controller) as shown in FIG. 2 and may originate directly from the IHS bus 121, or any other IHS. The signal control input channel may connect a host computer, or any part of a host computer, to the tri-state buffers. This signal control input channel enables communication between the host computer and the tri-state buffers. The host computer may include a USB host controller, and the control signals to drive the buffers may originate independently of the USB controller.

A baseboard management controller (BMC) may provide for "out-of-band" communication operating as a GPIO in association with IHS bus 121 to drive the disable/enable signals to buffers B1 and B2 for host USB ports (i.e. downstream facing connectors). A BMC is a specialized microcontroller embedded in an IHS, especially servers. The BMC is the intelligence in the Intelligent Platform Management Interface (IPMI) architecture. The IPMI specification defines a set of common interfaces to computer hardware and firmware which system administrators can utilize to monitor system health and manage the system. IPMI operates independently of the OS and allows administrators to manage a system remotely even in the absence of the OS or the system management software, or even if the monitored system is not powered on. IPMI can also function when the OS has started, and offers enhanced features when used with the system management software.

The IPMI consists of a main controller (the BMC) and other satellite controllers. The satellite controllers within the same chassis are connected to the BMC via the system interface called IPMB (Intelligent Platform Management Bus/Bridge). The BMC connects to satellite controllers or another BMC in another chassis via IPMC (Intelligent Platform Management Chassis) bus/bridge.

The BMC may manage the interface between system management software and platform hardware. The BMCs can control the port management and enablement/disablement signals that are distributed directly to the buffers. This enables driving a GPIO (and therefore the enablement/disablement signal to B1 and/or B2) by the host, by the server manager, a BMC or a surface processor.

A remote user-operator can come in through the server management interface to turn off or on the local USB ports or selectively enable/disable the ports without the host OS knowledge or without any interaction with BIOS or a user needing to reboot the server or take down the transaction processing, web server or whatever it is doing.

While various embodiments have been shown and described, various modifications and substitutions may be made thereto without departing from the spirit and scope of the invention. Accordingly, it is to be understood that the present invention has been described by way of illustrations and not limitation.

What is claimed is:
1. An information handling system (IHS) comprising:
a host computer comprising a downstream facing host computer serial communication bus port and a serial communication bus host controller in communication with the downstream facing host computer serial communication bus port;
the serial communication bus host controller in communication with the downstream facing host computer serial communication bus port via a serial communication bus+ data line and a serial communication bus− data line;
a first tri-state buffer connected to the serial communication bus+ data line;
a second tri-state buffer connected to the serial communication bus− data line; and
a circuit disposed between the serial communication bus host controller and the downstream facing host computer serial communication bus port, the circuit operable to disable the downstream facing host computer serial communication bus port from detecting presence of a peripheral device directly coupled to the serial communication bus port.

2. The system of claim 1 wherein the serial communication bus is a universal serial bus (USB).

3. The system of claim 1 wherein the peripheral device is a serial communication device.

4. The system of claim 2 further comprising a universal serial bus host controller.

5. The system of claim 2 wherein the first and second tri-state buffers further comprise at least one of: an NMOS transistor and a PMOS transistor.

6. An information handling system (IHS) comprising:
a host computer comprising a downstream facing host computer serial communication bus port residing within the host computer, and a serial communication bus host controller, wherein the controller is configured to detect a serial communication bus device connected to the downstream facing host computer serial communication bus port, wherein the serial communication bus device has a pull-up resistor; and
a circuit disposed between the serial communication bus host controller and the downstream facing host computer serial communication bus port, the circuit configured to disable the downstream facing host computer serial communication bus port from detecting presence of a peripheral device directly coupled to the serial communication bus port, and wherein the circuit comprises at least one tri-state buffer.

7. The system of claim 6 wherein the serial communication bus is a universal serial bus (USB).

8. The system of claim 7 further comprising a host computer IHS bus configured to download buffer control information to the circuit.

9. The system of claim 7 wherein the circuit further comprises a first control input pad and a second control input pad to receive buffer control information from an IHS bus.

10. The system of claim 7 further comprising a small outline transistor.

11. The system of claim 7 wherein an IHS bus provides control signals to a small outline transistor.

12. The system of claim 7 wherein a baseboard management controller (BMC) provides control signals to at least one tri-state buffer.

13. A method of disabling a downstream facing serial communication bus port residing within a host computer, the method comprising:
providing a circuit disposed between a serial communication bus host controller and the downstream facing serial communication bus port, the circuit comprising a first tri-state buffer and a second tri-state buffer;
enabling the first tri-state buffer to sink current on a serial communication bus+ line wherein the serial communication bus + line is positioned between a serial communication bus host controller and a downstream facing serial communication bus port;
enabling the second tri-state buffer to sink current on a serial communication Bus− line wherein the serial communication bus− line is positioned between a serial communication bus host controller and a downstream facing serial communication bus port; and thereby
disabling the downstream facing serial communication bus port from detecting presence of a peripheral device directly coupled to the serial communication bus port.

14. The method of claim 13 wherein the serial communication bus is a universal serial bus (USB).

15. The method of claim 14 further comprising sending a control signal from a host computer IHS bus to the first and second tri-state buffer.

16. The method of claim 14 further comprising a circuit with a first control input pad and a second control input pad to receive the control signal from an IHS bus.

17. The method of claim 16 wherein the circuit further comprises a small outline transistor.

18. The method of claim 14 wherein the first and second tri-state buffers receive control signals from a baseboard management controller.

19. The method of claim 14 wherein the first and second tri-state buffers receive control signals from a virtual KVM switch.

20. The system of claim 1, wherein the circuit is operable to enable the first tri-state buffer to sink current on the serial communication bus+ data line and enable the second tri-state buffer to sink current on the serial communication bus− data line to disable the downstream facing host computer serial communication bus port.

* * * * *